C. D. CHAVIS.
POTATO RICER.
APPLICATION FILED JAN. 4, 1908.
916,420.
Patented Mar. 30, 1909.
2 SHEETS—SHEET 1.
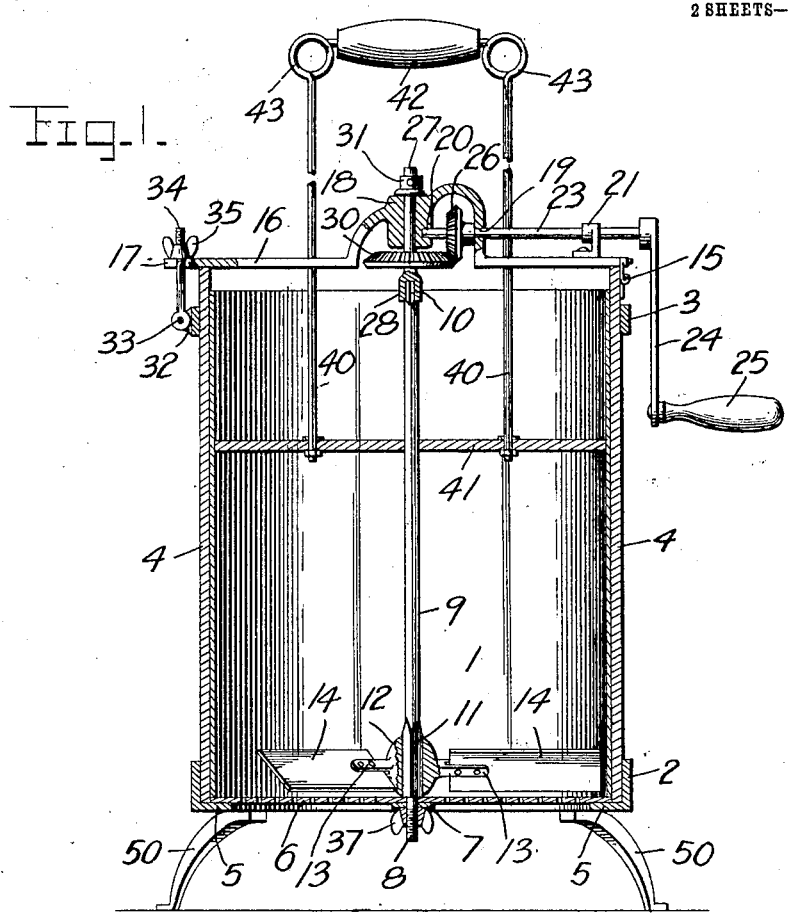
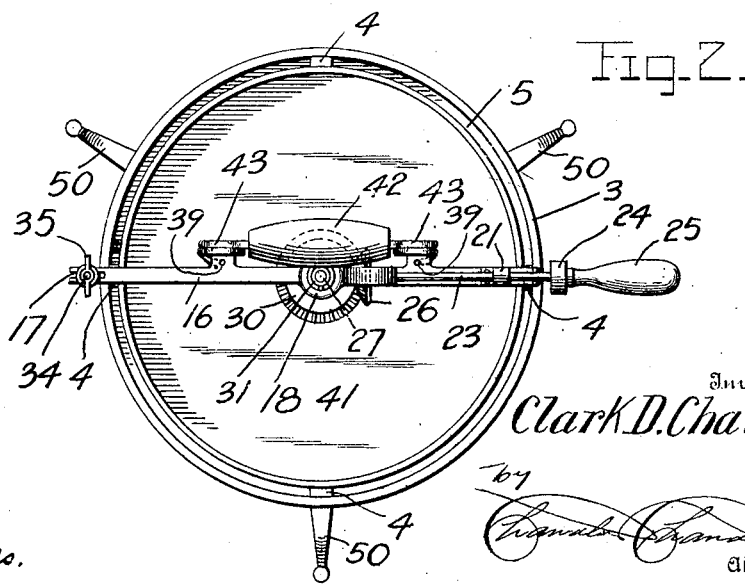
Witnesses
Inventor
Clark D. Chavis
by
Attorneys

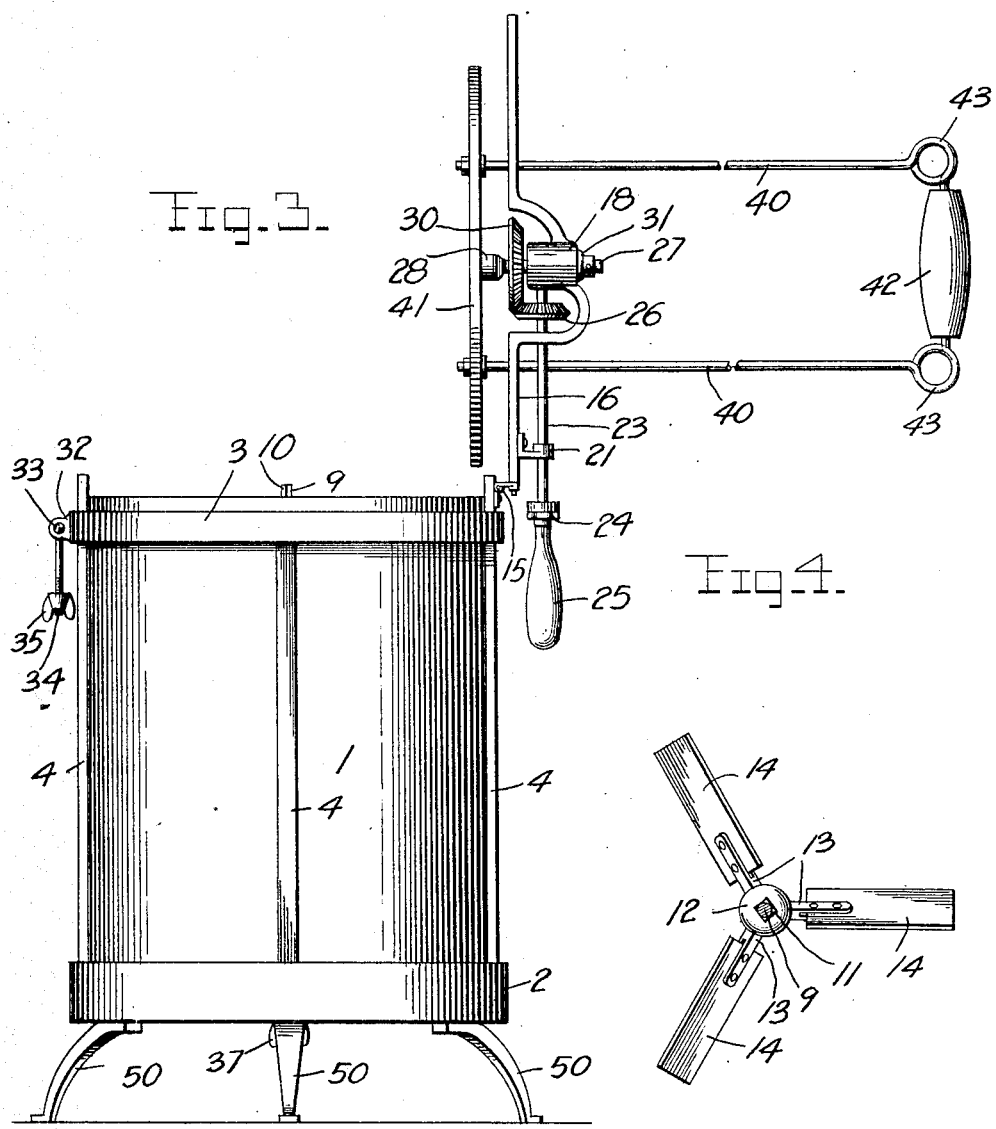

UNITED STATES PATENT OFFICE.

CLARK D. CHAVIS, OF ST. PAUL, MINNESOTA.

POTATO-RICER.

No. 916,420.   Specification of Letters Patent.   Patented March 30, 1909.

Application filed January 4, 1908. Serial No. 409,310.

*To all whom it may concern:*

Be it known that I, CLARK D. CHAVIS, a citizen of the United States, residing at St. Paul, in the county of Ramsey, State of Minnesota, have invented certain new and useful Improvements in Potato-Ricers; and I do hereby declare the following to be a full, clear, and exact description of the invention, such as will enable others skilled in the art to which it appertains to make and use the same.

This invention relates to that class of devices known as potato ricers, the object being to mash potatoes and then force them through a sieve so that the potatoes appear vermicelli-formed.

In the accompanying drawings I have shown in Figure 1 a sectional view of a potato ricer embodying my invention. Fig. 2 shows a top view of my potato ricer. Fig. 3 shows a side view disclosing the top thrown back to receive the potatoes, and, Fig. 4 discloses a top view of the ricing blades as used in my invention.

In carrying out the object of my invention I use a suitable receptacle 1 reinforced upon the bottom edge by means of a flanged supporting ring 2 while the receptacle 1 at its upper end is further reinforced by means of a ring 3.

Extending vertically from one ring to the other are four vertically disposed bars 4 as shown in Figs. 1 and 3.

Held upon the inwardly extending flange 5 of the supporting ring 2 is a perforated disk 6 through which the potatoes are forced. This perforated disk 6 is reinforced as is shown at 7 and has a central opening to receive the lower threaded stem 8 of the blade shaft 9 which is provided with an upper square coupling end 10 as disclosed. To the lower portion of this shaft 9 which is enlarged as is shown at 11 is secured a head 12 having suitable extending arms 13 which arms are adapted to receive the ricing blades 14, there being three such blades as disclosed in Fig. 4, these blades being held at an angle to the perforated bottom 6 as will be understood in referring to Fig. 1.

Secured to one of the frame members 4 is a hinge 15 which supports the bearing bar 16 which has its projecting end bifurcated as is shown at 17 and is provided with a central bearing or hub 18 and the vertically disposed bearing yoke 19 as clearly shown in Fig. 1, a socket 20 being formed within the bearing 18 in alinement with the bearing or hub 19. At a suitable point there is secured to this bearing bar 16 an ear 21 and held within this ear 21, the bearing in the yoke 19 and the socket 20 is the driving shaft 23 provided with the operating crank 24 having the handle 25 while within the yoke 19 is held a pinion 26 as clearly disclosed. Vertically held within the bearing or hub 18 is a stub shaft 27 which below is provided with a socket 28 adapted to receive the square coupling end 10 of the blade shaft 9 as shown in Fig. 1. Secured to this stub shaft 27 is a gear 30 which meshes with the pinion 26. Above this stub shaft is provided a collar 31 as disclosed. Secured to the upper ring 3 at a point below the bifurcation 17 is an ear 32 carrying a pin 33 supporting the threaded stem 34 in turn carrying the thumb screw 35. This thumb screw is adapted to be screwed down upon the bearing bar 16 when the stem is carried into the bifurcation when the bearing bar is to be locked to the frame. At two suitable points as shown in Fig. 2 the bearing plate 16 is provided with the outwardly extending ears 39 which ears are perforated and through which the vertical spring rods 40 extend which are secured to a follower 41 adapted to work upon the blade shaft 9. These vertical spring rods are in one piece, are approximately U-shaped and above receive a handle 42. At the sides in order to provide a spring the rods 40 are provided with the coils 43. The follower 41 is provided with apertures for the shaft 9 and the rods 40. Now in its operation the crank 24 is rotated to turn the ricing blades which being positioned at an angle to the perforated bottom plate 6 are adapted to force the potatoes with which the blades come into contact, downward and through the perforations within the plate 6 so that the potatoes are forced out in small round string-like masses, this operation being known as ricing potatoes, the vermicelli-formed potatoes being known as riced potatoes.

The potatoes within the receptacle are forced down by the follower 41 which is a manually pressed follower and in order to insure a sort of cushion contact of the follower with the potatoes, I have provided the coils within the rods or stems supporting the handle 42 as shown. The receptacle is supported upon suitable legs 50 as is shown.

When the potatoes are to be inserted into the receptacle 1, the follower 41 is first carried up so that it is stopped by the hub 28 of the stub shaft 27 when the thumb screw 35 is released and thrown down as shown in Fig. 1, in which condition the bearing bar 16 may be thrown backward the crank 24 first having been carried into a vertical position. The socket or hub 28 readily slips off of the shaft 9. This tilting of the bearing bar 16 also facilitates the cleaning of the device which is neat and simple of construction.

The ricing blades may readily be removed by simply unscrewing the lower thumb screw 37 working upon the threaded end 8 of the shaft 9.

While I have described my device as used for ricing potatoes it is of course understood that other vegetables or articles of a proper consistency could be forced through the perforated plate 6.

And having thus described my said invention what I claim as new is—

1. A potato ricer comprising a receptacle having a perforated bottom in combination with a blade shaft revolubly held at its lower end within said bottom, of a hub upon said shaft, ricing blades held at an angle to said perforated bottom secured to said hub, a bearing bar hinged to the upper end of said receptacle having a horizontal and a vertical bearing, a perforated ear having its perforation in alinement with said horizontal bearing, a crank shaft within said ear and horizontal bearing, a pinion upon said crank shaft, a stub shaft within said vertical bearing having a socket adapted to be engaged by said blade shaft, a gear upon said stub shaft in engagement with said pinion, a manually pressed follower within said receptacle and surrounding said blade shaft, two rods projecting from said follower, and a handle secured to said rods said rods passing through openings within said bearing bar and being carried and guided by said bar, all arranged substantially as shown.

2. A potato ricer, comprising a receptacle having a perforated bottom, in combination with a blade shaft revolubly held at its lower end within said bottom, of a hub upon said shaft, ricing blades secured to the lower end of said shaft, a bearing bar hinged to the upper end of said receptacle, having a horizontal and a vertical bearing, a perforated ear having its perforation in alinement with said horizontal bearing, said vertical bearing being in alinement with said blade shaft, a crank shaft within said ear and horizontal bearing, a pinion upon said crank shaft, a stub shaft within said vertical bearing having a socket engaged by the upper end of said blade shaft, a gear upon said stub shaft in engagement with said pinion, a manually-operated follower within said receptacle, and two rods extending from said follower each having a coil at its upper end, said rods being connected, all arranged as and for the purpose set forth.

In testimony whereof, I affix my signature, in presence of two witnesses.

CLARK D. CHAVIS.

Witnesses:
H. GALLICK,
BENJ. F. BURRELL.